Oct. 14, 1947.    C. K. DAVIS    2,428,962
ONE-WAY CLUTCH
Filed June 25, 1945

INVENTOR.
CARL K. DAVIS
BY
Whittemore Hulbert & Belknap
ATTORNEYS

Patented Oct. 14, 1947

2,428,962

UNITED STATES PATENT OFFICE 2,428,962

ONE-WAY CLUTCH

Carl K. Davis, Detroit, Mich., assignor to The Gear Grinding Machine Company, Hamtramck, Mich., a corporation of Michigan Application June 25, 1945, Serial No. 601,415

6 Claims. (Cl. 192—45.1)

1

The invention relates to one-way clutches of that type in which a series of sprags are arranged between spaced concentric cylindrical surfaces respectively in the drive and driven members. With such constructions relative rotation of the drive and driven members will be free in one direction, but in the reverse direction will cause instantaneous clutching by said sprags. It is, however, necessary that the sprags should have their end surfaces held in contact with the adjacent cylindrical surfaces of the drive and driven members and with sufficient pressure to produce the necessary friction for instantaneous clutching.

It is the object of the invention to obtain a construction in which the sprags of the entire series are held in spaced relation to each other and individually tensioned to hold the same in frictional engagement with the cooperating surfaces. To this end the invention consists in the construction as hereinafter set forth.

Figure 3:
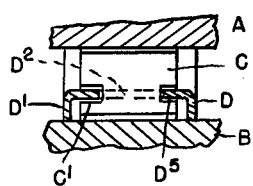
Fig. 3 is a cross section on line 3—3, Fig. 1, with the ring and sprags arranged between the concentric cylindrical surfaces of the drive and driven members.

As shown in Fig. 3, A and B are drive and driven members of the clutch which have spaced concentric cylindrical surfaces. As the specific construction of these members is not a part of the instant invention, this is not shown in detail. C are sprags arranged between the surfaces of the members A and B and D is a cage or retainer for holding the sprags in spaced relation to each other. The member D is annular and is preferably of channel-shaped cross section being provided with the radially outwardly extending opposite side flanges D' connected by a web portion D². The web portion has portions cut out therefrom to form entrance slots D³ of an area to receive the sprag C and with narrower circumferential extensions D⁴. The sprags C are provided at their opposite ends with slots C' for receiving the portions D⁵ at opposite ends of the extension D⁴. Thus, by first entering this sprag through the aperture D³ and then moving it laterally, it will be engaged with the portions D⁵

2 of the web to retain it from displacement. The web D² has a portion on the opposite side of each of the apertures D³ and centrally between the flanges D' which is struck radially inward to form an inclined tongue D⁶. This tongue is adapted to receive thereabout a small coil spring E, one end of which abuts against the base of the tongue, while the other end engages the inner end portion of the sprag C. The spring, therefore, exerts a resilient pressure against the sprag tending to turn it towards the radius and also holding it from disengagement from the retaining portions D⁵.

Figure 1:
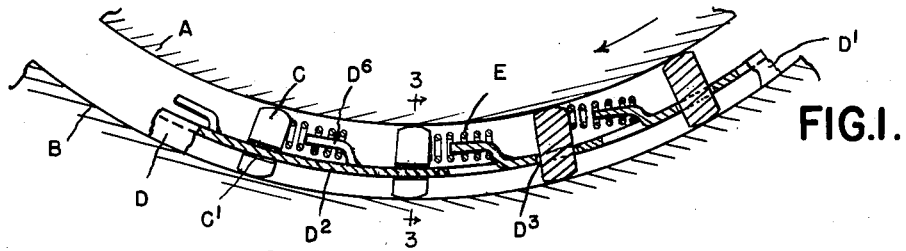
Fig. 1 is an elevation of a retainer ring in which the sprags of the series are mounted.
Figure 2:
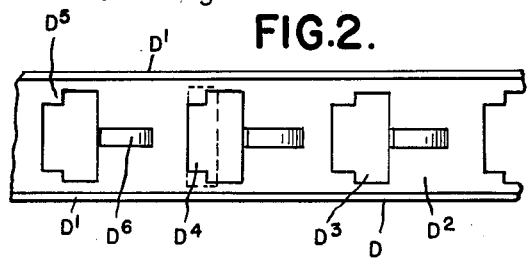
Fig. 2 is a plan view of a portion of the retainer without the sprags.

With the construction as described, after all of the sprags have been engaged with a retainer D and springs E, the whole assembly may be inserted between the concentric surfaces of the members A and B. To permit of this, the sprags must be tilted against the pressure of the springs E, which must be accomplished by any suitable assembling tool. When properly positioned, the springs E will hold the sprags in frictional engagement with the cooperating cylindrical surfaces, but with only sufficient pressure to insure the required initial friction. Thus, rotation of one of the members, as for instance the inner member A, in the direction indicated by the arrow, Fig. 1, will cause instantaneous clutching engagement, while rotation in the reverse direction will free the members A and B from each other.

Figure 5:
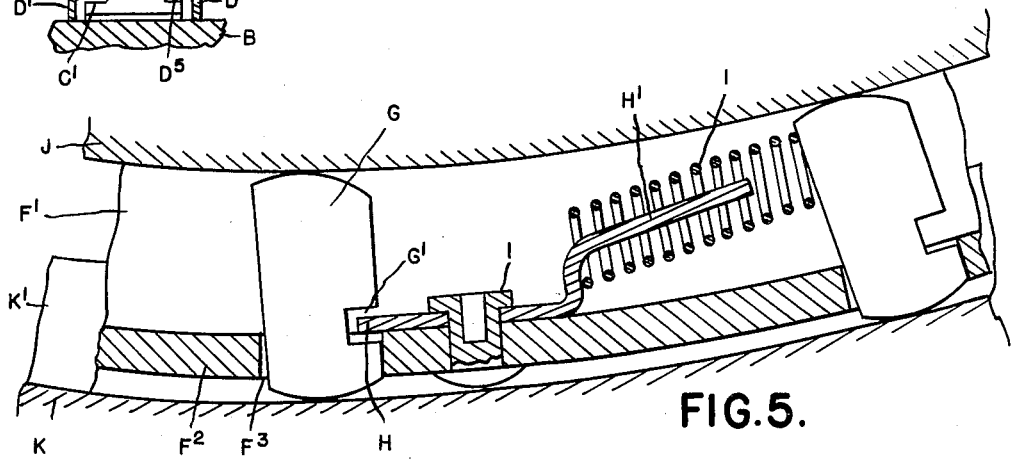
Fig. 5 is a view similar ot Fig. 1 of the modified construction shown in Fig. 4.
Figure 4:
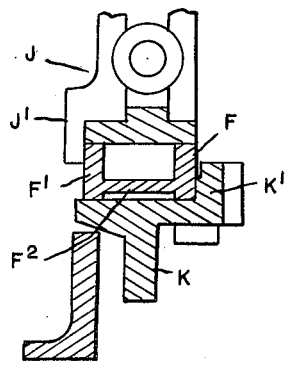
Fig. 4 is a view similar to Fig. 3 illustrating a modified construction.

In the modified construction illustrated in Figs. 4 and 5, a retainer ring F is formed of an H-shaped cross section having the side members F' and connecting web member F². Apertures F³ are formed in this web and are of an area but slightly greater than that of the sprags G. Each of the latter is provided with the recess G' on one side thereof for receiving a tongue H and which forms a retaining means therefor. The tongues H are originally separate from the web F² to permit of entering the sprags G in the apertures F³. These tongues are then secured to the webs by suitable means, such as a rivet I. The opposite end portion of each of the tongues H is bent to form an inclined tongue portion H' for receiving a coil spring I, which latter bears against a side of the next adjacent sprag and resiliently presses it towards the radius. This construction will operate in the same way as the construction previously described, but the side portions F' of the retainer perform the additional function of spacers and bearings for holding the inner and outer cylindrical surfaces in concentric relation to each other. As shown in Fig. 4, the member J forming the inner cylindrical surface has a radially outwardly projecting flange J' adjacent to one of the sides F'' of the member F and the member K forming the outer cylindrical surface has a radially inwardly extending flange K' adjacent to the opposite side F'' of the member F. These flanges together with the retainer F will take care of end-thrust.

What I claim as my invention is:

1. In a one-way rotary clutch, an annular series of spaced sprags, each sprag having a recess therein intermediate the ends thereof, an annular retainer having spaced apertures through which the individual sprags are radially inserted, detents on said retainer for engaging the recesses of the individual sprags to retain the same with freedom for rocking movement, tongues on said retainer between the sprags having a portion extending substantially perpendicular to an adjacent sprag and an offset portion forming a spring abutment and coil springs sleeved on said tongues and bearing against said abutment and adjacent sprags resiliently biasing the same to rock in one direction.

2. In a one-way rotary clutch, an annular series of spaced sprags, each sprag being transversely slotted on opposite sides thereof, an annular retainer of channel-shaped cross section having a web portion apertured at spaced intervals, each aperture having an entrance portion for the insertion of a sprag therethrough and an extension portion of lesser width for receiving said sprag with the opposite sides of said extension engaging the slotted sides of said sprag to retain the same with freedom for rocking movement, tongues struck up from said web portion intermediate the apertures therein, and coil springs sleeved on said tongues bearing against adjacent sprags for resiliently biasing the same to rock in one direction.

3. In a one-way rotary clutch including coaxial independently revoluble members having spaced concentric annular surfaces, an annular series of sprags, an annular retainer of H-shaped cross section, the sides of the H forming spacers and bearings for said annular surfaces to hold the same concentric, the cross portion of the H having a series of apertures therethrough for the passage of said sprags, detents on said cross portion for engaging said sprags intermediate the ends thereof to hold the same from disengagement but with freedom for rocking movement, tongues struck up from said cross portion intermediate the apertures therein, and coil springs engaging said tongues and bearing against the adjacent sprag resiliently biasing the same to rock in one direction.

4. In a one-way rotary clutch including coaxial independently revoluble members having spaced concentric annular surfaces, an annular series of sprags having recesses therein, an annular retainer of channel-shaped cross section having a web portion apertured at spaced intervals for the passage of sprags therethrough, and detents on said web portion engaging the recesses of individual sprags to retain the same with freedom for rocking movement, the sides of said channel-shaped retainer constituting bearings for engaging one of said concentric surfaces and holding said retainer parallel thereto.

5. In a one-way rotary clutch including coaxial independently revoluble members having spaced concentric annular surfaces, an annular series of sprags, an annular retainer of H-shaped cross section, the sides of the H forming a spacer and bearings for said annular surfaces to hold the same in concentric relation, and the cross portion of the H having a series of apertures therethrough for the passage of said sprags, and detents on said cross portion for engaging said sprags intermediate the ends thereof to hold the same from disengagement from said retainer but with freedom for rocking movement.

6. In a one-way rotary clutch including coaxial independently revoluble members having spaced concentric annular surfaces and a shoulder projecting radially beyond and at one end of the annular surface of each of said members being arranged at opposite ends in the two members, an annular series of sprags, an annular retainer of H-shaped cross section, the sides of the H forming a spacer and bearings for said annular surfaces to hold the same in concentric relation and the cross portion of the H having a series of spaced apertures therethrough for the passage of said sprags, and detents on said cross portion for engaging said sprags intermediate the ends thereof to hold the same from disengagement but with freedom for rocking movement, said H-shaped member in cooperation with said shoulders forming an end-thrust bearing.

CARL K. DAVIS.

REFERENCES CITED

The following references are of record in the file of this patent:

UNITED STATES PATENTS

| Number | Name | Date |
| --- | --- | --- |
| 1,694,377 | De Lavaud | Dec. 11, 1928 |
| 2,383,595 | Dodge | Aug. 28, 1945 |